US007529072B2

(12) United States Patent
Nishikawa

(10) Patent No.: US 7,529,072 B2
(45) Date of Patent: May 5, 2009

(54) PROTECTION APPARATUS

(75) Inventor: Masahiro Nishikawa, Koka (JP)

(73) Assignees: NEC SCHOTT Components Corporation, Koka-shi (JP); Honda Motor Co., Ltd., Tokyo (JP)

( * ) Notice: Subject to any disclaimer, the term of this patent is extended or adjusted under 35 U.S.C. 154(b) by 23 days.

(21) Appl. No.: 11/494,360

(22) Filed: Jul. 26, 2006

(65) Prior Publication Data

US 2007/0025042 A1 Feb. 1, 2007

(30) Foreign Application Priority Data

Jul. 29, 2005 (JP) ............................ 2005-220235

(51) Int. Cl.
*H02H 5/04* (2006.01)

(52) U.S. Cl. ...................................... 361/104; 361/103

(58) Field of Classification Search ..................... 361/8, 361/103, 104
See application file for complete search history.

(56) References Cited

U.S. PATENT DOCUMENTS

| | | | | |
|---|---|---|---|---|
| 3,828,289 | A * | 8/1974 | Hickling | 337/5 |
| 5,536,980 | A * | 7/1996 | Kawate et al. | 307/116 |
| 5,631,621 | A * | 5/1997 | Nakajima | 337/280 |
| 6,351,361 | B1 * | 2/2002 | Kawazu et al. | 361/103 |
| 7,038,569 | B2 * | 5/2006 | Hamada | 337/290 |
| 2005/0088272 | A1 | 4/2005 | Yoshikawa | |
| 2005/0179516 | A1 | 8/2005 | Yoshikawa | |

FOREIGN PATENT DOCUMENTS

| | | |
|---|---|---|
| DE | 103 11 090 | 9/2003 |
| JP | 04-282523 | 10/1992 |
| JP | 06-243767 | 9/1994 |
| JP | 2000-123694 | 4/2000 |
| JP | 2000-133102 | 5/2000 |
| JP | 2003-297206 | 10/2003 |
| JP | 2003-317589 | 11/2003 |
| JP | 2004-319239 | 11/2004 |
| JP | 2005-158681 | 6/2005 |

* cited by examiner

*Primary Examiner*—Danny Nguyen
(74) *Attorney, Agent, or Firm*—W. F. Fasse; W. G. Fasse

(57) ABSTRACT

A protection apparatus is provided that can use a thermal fuse at higher voltage and higher current. The protection apparatus includes a protection circuit connected in series between a power supply and a load. The protection circuit includes a thermal fuse with a predetermined operating temperature, activated in response to sensing overheating of the power supply and/or load, and an electrosensitive fuse connected in parallel with the thermal fuse, and activated at a predetermined operating current. The electrosensitive fuse is adapted to be activated only after the thermal fuse has been activated at the predetermined operating temperature.

22 Claims, 1 Drawing Sheet

PROTECTION APPARATUS

BACKGROUND OF THE INVENTION

1. Field of the Invention

The present invention relates to a protection apparatus employing a thermal fuse, including a protection circuit to extend the area of use of the thermal fuse to equipment directed to high voltage and high current. Particularly, the present invention relates to a protection apparatus that can avoid an abnormal event immediately after activation of a thermal fuse by using an electrosensitive fuse with the thermal fuse.

2. Description of the Background Art

A thermal fuse is a protection component to properly sense abnormal overheating at the electric apparatus and quickly cut off the circuit. A thermal fuse is employed in various home electrical products, portable apparatuses, communication equipment, business machines, in-car devices, air conditioners, AC adapters, chargers, batteries, and electronic components. In general, thermal fuses are mainly classified into two types depending upon the thermosensitive material employed. Specifically, there are known a fusible alloy type thermal fuse using conductive low-melting fusible alloy for the thermosensitive material, and a thermosensitive pellet type thermal fuse employing a non-conductive thermosensitive substance. Both are activated in response to sensing abnormal temperature rise at the electrical apparatus to which it is attached to cut off the current to the electric apparatus. Both function to protect electrical equipment by switching the conductive state of the current-carrying path, and are also referred to as "non-reset thermal switches". In other words, they are protection means for electric products achieving a cut-off state by reversing the conductive state in the initial ordinary temperature state at a predetermined operating temperature. The operating temperature for activation depends on the thermal sensitive material employed. In general, the operating temperature is 60° C. to 250° C. A wide selection of general-purpose protection components that function with the rated current in the range of 0.5 A to 15 A is commercially available.

For example, as disclosed in Japanese Patent Laying-Open Nos. 2005-158681 and 2003-317589, a thermosensitive pellet type thermal fuse that has the characteristics of low internal resistance and high breaking current allows an operating temperature to be set arbitrarily over a wide range by employing a thermosensitive pellet formed of thermoplastic resin. A fusible alloy type thermal fuse with a low cut-off current, hermetically sealed in an insulative case to detect the temperature, has flux attached to low-melting fusible alloy to achieve cut off by rendering the fusible alloy globular when fused, and has a relatively low operating temperature of 60° C.-230° C. As disclosed in Japanese Patent Laying-Open Nos. 06-243767 and 04-282523, the flux attached on the surface of the low-melting fusible alloy serves to prevent disturbance of an oxide film and break the electrical connection between electrodes through the fusible alloy that melts at a predetermined temperature and rendered globular by the surface tension, when the low melting fusible alloy is fused at the melting temperature.

Current fuses include various types such as the glass-tube type, the time-lag type that operates with delay, the high withstand voltage and high current type, and the like. In general, the regulation calls for activation within 2 minutes with respect to overcurrent of 200% the rated current. There is also known a fuse that is activated at an elapse of at least one minute of the conducting duration even if the current is below 2 times the rated current. There is also known a resistance fuse that is locally made thin to be blown out by the Joule heat caused by the resistance. In a circuit that uses such a current fuse that interrupts the circuit in response to sensing current, a hazardous condition may be induced by overheating due to generation of Joule heat by the load per se and/or rise of the ambient temperature. To avoid this critical condition, a thermal fuse is used together to cut off the circuit safely to eliminate an overheating state.

A composite structure using a thermal fuse and a current fuse together is also known. The fuse elements are arranged in series connection on the same substrate in an insulative package, including an intermediate electrode. This type of composite fuse is known, as disclosed in Japanese Patent Laying-Open No. 2003-297206, for example. The composite fuse has the tips of a pair of lead conductors secured to a resin base film with an intermediate electrode between the conductor tips, wherein a thermal fuse element and a current fuse element are connected at one side and the other side, respectively. Further, Japanese Patent Laying-Open No. 2000-123694 discloses a composite fuse with a thermal fuse element that is blown by sensing heat generated by a current fuse element. Japanese Patent Laying-Open No. 2000-133102 discloses a composite structure of a current fuse and a thermal fuse, each fuse element connected between an intermediate electrode and each tip of a pair of lead conductors, using a lead frame constituting an outer frame.

SUMMARY OF THE INVENTION

In the case where a thermal fuse is to be used attached to an electrical apparatus, an appropriate thermal fuse corresponding to the load capacity is selected from general-purpose thermal fuses that are commercially available. There are cases where it is desirable to extend the adaptable region of the thermal fuse. For example, a general-purpose type thermal fuse directed to a resistance load using an AC (Alternate Current) power supply corresponds to at most 250V in voltage and at most 15 A in current. When this thermal fuse is used with a DC (Direct Current) power supply, the arc discharge that is generated at the time of blowing the thermal fuse may continue to induce disadvantage. In other words, when the thermal fuse senses overheating and is activated at the operating temperature to interrupt the circuit, the plasma generated between the contacts that are cut off by the thermal fuse may continue to cause plasma discharge since the polarity does not change for this direct current as it does for an alternating current, thus leading to contingencies.

Therefore, the applicable range of the general-purpose type thermal fuse is restricted within the rating condition of at most 24V in voltage and at most 10 A in current when the breaking current is high. In the case where the thermal fuse is employed for preventing overheating at a direct current induced resistance load or power supply equipment, it is desirable to eliminate the disadvantage caused by plasma discharge at the time of circuit interruption due to activation of the thermal fuse. There is a demand for a safe protection apparatus that can extend the area of use, employing commercially-available thermal fuses to allow usage at higher voltage and higher current. In the field of general-purpose type current fuses, there are various products exhibiting a wide electric rating and properties with cut-off capability, and are used for the protection of most electrical apparatuses.

The present invention is directed to solving the disadvantages set forth above, and an object is to provide a novel and improved protection apparatus including a protection circuit to allow usage of an existing product at higher voltage and higher current. There is provided a protection apparatus that can accommodate high load, forming a protection circuit by using together an electrosensitive fuse and a thermal fuse having a predetermined internal resistance, based on the internal resistance of a general-purpose thermosensitive pellet type thermal fuse or fusible alloy type thermal fuse.

According to the present invention, a protection apparatus includes a protection circuit connected in series between a power supply and a load. The protection circuit includes a thermal fuse with a predetermined operating temperature, activated in response to sensing overheating at the power supply and/or load, and an electrosensitive fuse connected in parallel with the thermal fuse, and activated at a predetermined operating current. The electrosensitive fuse is adapted to be activated only after the thermal fuse has been activated at the predetermined operating temperature. The flowing current of the electrosensitive fuse is at most 50% of the main current in a load steady state. The predetermined operating current at which the electrosensitive fuse is activated is at least two times the flowing current of the electrosensitive fuse, and set to be lower than 100% of the main current. The electrosensitive fuse is blown after activation of the thermal fuse. Accordingly, the discharge generated between the electrodes of the thermal fuse can be prevented.

The protection apparatus of the present invention includes a protection circuit having a thermal fuse and an electrosensitive fuse connected in parallel. The protection circuit is connected in series between a power supply and load. The flowing current of the electrosensitive fuse with respect to the main current is determined by the internal resistance of the electrosensitive fuse and the internal resistance of the thermal fuse employed in the protection circuit. The rated value of the electrosensitive fuse is set based on the flowing current. The internal resistance of the fuses is as described below. When the internal resistance is to be represented as a resistance value corresponding to the entire length of 25 mm including the lead, the thermosensitive pellet type thermal fuse and the fusible alloy type thermal fuse have an internal resistance of approximately 1.5 mΩ/25 mm at most and approximately 15 mΩ/25 mm at most, respectively. Therefore, both types can be used. The internal resistance of a current fuse is generally larger than that of the thermal fuses set forth above, depending upon the rated current. By using a general-purpose type thermal fuse and general-purpose type current fuse that are commercially available, the protection circuit can be lowered in cost. A protection apparatus employing a thermal fuse that can accommodate the load of high voltage and high current can be provided.

In the protection circuit having a thermal fuse connected in parallel with an electrosensitive fuse of the present invention, the electrosensitive fuse will not be activated unless the thermal fuse is activated. When the thermal fuse is activated at a predetermined operating temperature, the electrosensitive fuse is then activated with a predetermined time lag. Therefore, arc discharge that will be generated when the thermal fuse is activated at the predetermined operating temperature can be suppressed. This is because the voltage applied between the disconnected contacts or the disconnected fusible alloy of the thermal fuse attaining a cut-off state is suppressed since current will flow through the electrosensitive fuse of the protection circuit. Although the electrosensitive fuse will melt due to the large current flowing thereto when the thermal fuse is activated to attain a cut-off state, arc discharge will not occur at the thermal fuse since there is a time lag in the circuit cut-off. The disadvantage involved in discharge following the cut-off of the thermal fuse will not occur. Since a fusible alloy type thermal fuse has the alloy set apart quickly at the time of melting to interrupt the circuit, a time lag of at least several μ seconds will induce no problem. In a thermosensitive pellet type thermal fuse, however, a time lag of at least several seconds is preferable since the circuit is interrupted according to the shift of the movable contacts in response to the melting of the thermosensitive substance.

An advantage of the present invention is that an economic protection apparatus can be provided using general-purpose products commercially available for the thermal fuse and electrosensitive fuse. By connecting an electrosensitive fuse in parallel with a thermal fuse, usage is allowed in an area exceeding the rated voltage and current of a thermal fuse. Further, arc discharge that occurs immediately after cut-off of the thermal fuse can be prevented. Particularly in the area of use of a thermal fuse employed for a power supply or load directed to a high voltage and high current load to prevent overheating, the applicable region to a high load apparatus can be extended by virtue of the parallel connection with an electrosensitive fuse. The disadvantage occurring at the time of overheating can be prevented. The production apparatus of the present invention allows the provision of safety protection means for car air conditioners and motor-driven tools in relation to vehicle-mounted systems and DC motors. Since the applicable range of the thermal fuse can accommodate load with the breaking current of 35 A-10000 A and voltage of AC600V or DC600V, the adaptive range can be increased.

The foregoing and other objects, features, aspects and advantages of the present invention will become more apparent from the following detailed description of the present invention when taken in conjunction with the accompanying drawings.

PREFERABLE EMBODIMENTS OF THE INVENTION

A protection apparatus employing a thermal fuse of the present invention includes a protection circuit. The protection circuit includes a thermal fuse with a predetermined operating temperature, activated in response to sensing overheating at a power supply and/or a load, and an electrosensitive fuse, connected in parallel with the thermal fuse, and activated at a predetermined operating current. The protection circuit is connected in series with the power supply and load. The electrosensitive fuse is characterized in that it is activated only after the thermal fuse has been activated at a predetermined operating temperature. Since the protection apparatus can be used at a load directed to high voltage and high current, the area of use of the thermal fuse can be extended.

Figure 1:
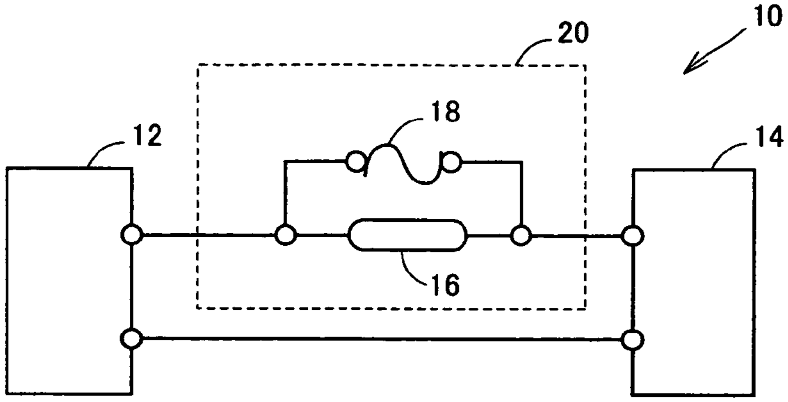
FIG. 1 is a circuit diagram of a protection apparatus employing a thermal fuse of the present invention.

FIG. 1 is a circuit diagram of a protection apparatus employing a thermal fuse of the present invention. A protection apparatus 10 of the present invention has a direct current power supply 12 and a load 14 connected, including a current fuse (not shown) for the main current. A protection circuit 20 includes a thermal fuse 16 and an electrosensitive fuse 18 connected in parallel. Protection circuit 20 is connected in series with power supply 12 and load 14. Thermal fuse 16 may be any of the thermosensitive pellet type or fusible alloy type. An appropriate type of thermal fuse is selected corresponding to the predetermined operating temperature from general-purpose products that are commercially available, depending upon the value of current employed in a normal state. Thermal fuse 16 senses overheating of load 14 and/or power supply 12. Therefore, it can be also used to prevent overheating at a control circuit in power supply 12 as well as circuit components of receptacles and the like.

$R_1$ is approximately 1.5 mΩ/25 mm at most for a thermosensitive pellet type thermal fuse, and 0.7 mΩ-0.9 mΩ/25 mm for many types. For a fusible alloy type thermal fuse, the internal resistance is approximately 15 mΩ/25 mm at most, and within the range of 3 mΩ-10 mΩ/25 mm for most types. Therefore, any of such types can be employed. Internal resistance $R_2$ of electrosensitive fuse 28 takes an extremely wide range. The actual measurement of an electrosensitive fuse of the general-purpose glass-tube type is approximately 10 mΩ-60Ω. Table 1 shows the relationship between the rated current and internal resistance for an electrosensitive fuse of the general-purpose glass-tube type.

TABLE 1

| Rated Current | 50 mA | 100 mA | 125 mA | 250 mA | 500 mA | 1A | 2A | 5A |
|---|---|---|---|---|---|---|---|---|
| Internal Resistance | 60Ω | 20Ω | 4Ω | 3Ω | 500 mΩ | 120 mΩ | 50 mΩ | 16 mΩ |

An electrosensitive fuse 18 with the rating as set forth below is employed. The flowing current through electrosensitive fuse 18 is set preferably to at most 50%, more preferably to at most 20%, and particularly preferably to at most 10% with respect to the main current that flows to the load in a steady state. An electrosensitive fuse 18 is employed having the rated value of the predetermined current at which electrosensitive fuse 18 is activated set preferably to at least 2 times, more preferably to at least 2.2 times, and particularly preferably to at least 2.5 times the flowing current of the electrosensitive fuse. Accordingly, electrosensitive fuse 18 is cut off with a predetermined time lag following activation of thermal fuse 16, such that arc discharge generated across electrodes at the activation of the cut-off of thermal fuse 16 can be prevented. For an electrosensitive fuse, any of a time lag type, glass-tube type, high voltage withstanding type, direct current voltage type, qualified as a general-purpose current fuse, can be selected. Alternatively, a resistance fuse can be selected. The internal resistance of an electrosensitive fuse is higher than the internal resistance of a thermal fuse. The thermal fuse can be employed in a range exceeding the nominal rated voltage value or nominal rated current value of the thermal fuse set forth above.

Figure 2:
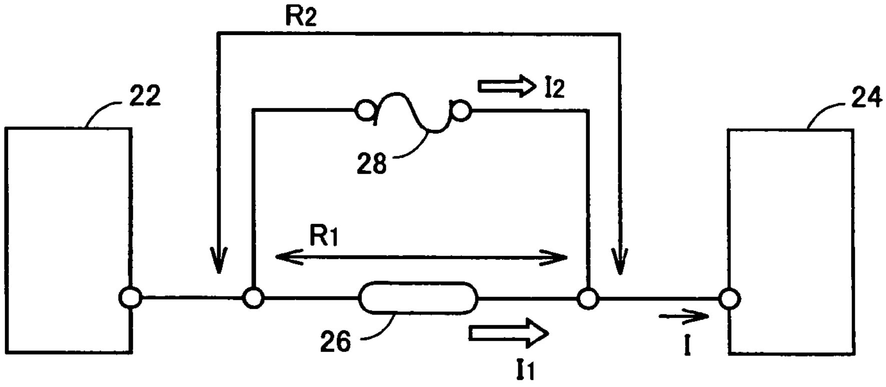
FIG. 2 represents the relationship between the current diverted flowing state and fuse internal resistance at a protection circuit in a protection apparatus employing the thermal fuse of the present invention.
Figure 3A:
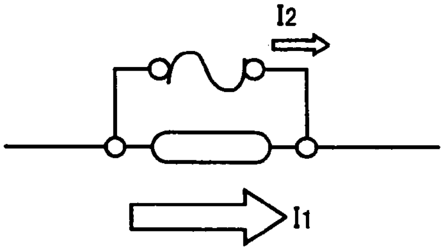
FIGS. 3A and 3B represent the relationship between the current diverted flowing state and fuse internal resistance at a protection circuit in a protection apparatus employing the thermal fuse of the present invention, the former corresponding to a normal state and the latter corresponding to an activated state.
Figure 3B:
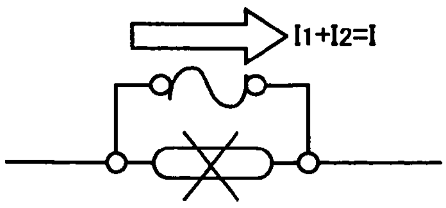

FIG. 2 and FIGS. 3A and 3B represent the relationship between the current diverting state and the internal resistance of each fuse at the protection circuit. As shown in FIG. 2, a thermal fuse 26 has an internal resistance $R_1$, and an electrosensitive fuse 28 has an internal resistance $R_2$. The main current I flowing from a power supply 22 to a load 24 in this circuit is the sum of current $I_1$ flowing through thermal fuse 26 and current $I_2$ flowing through electrosensitive fuse 28. Therefore, current $I_2$ flowing through electrosensitive fuse 28 in a normal operating state is represented by equation (1).

$$I_2=(R_1\times I)(R_1+R_2) \quad (1)$$

From the standpoint of ensuring reliable operation of electrosensitive fuse 28 at main current I, but not at current $I_2$ set forth above, and adjusting the time lag after the thermal fuse is cut off and before the electrosensitive fuse is cut off, electrosensitive fuse 28 is adapted to operate at a current value of preferably lower than 100%, more preferably at most 50%, and particularly preferably at most 36% of main current I. For actual measurements of the total length of 25 mm including the lead employed in a practical circuit, internal resistance Specifically, when main current I is approximately 10 A and a thermosensitive pellet type thermal fuse with an internal resistance $R_1$ of 1.0 mΩ/25 mm is employed, current $I_2$ flowing through electrosensitive fuse 28 is as set forth below from equation (1), assuming that internal resistance $R_2$ of the electrosensitive fuse is 20 mΩ.

$$I_2=(1\times10)/(1\pm20)=0.48(A)$$

Since flowing current $I_2$ is 0.48 A, the current value of two times the flowing current is 0.96 A. Therefore, a general-purpose current fuse having a rating of at least 1 A and not more than 10 A, and an internal resistance of approximately 20 mΩ is selected as electrosensitive fuse 28 to be used in the protection circuit.

FIG. 1 represents an example of a protection apparatus according to an embodiment of the present invention. When load 14 exhibits overheating during operation such that thermal fuse 16 reaches a predetermined operating temperature, thermal fuse 16 activates to attain a cut-off state. Electrosensitive fuse 18 in parallel connection operates properly in the connected state. Therefore, current flows to load 14, immediately after thermal fuse 16 is cut off, until electrosensitive fuse 18 is activated to attain a cut-off state. As a result, arc discharge generated across electrodes immediately after the cut-off of thermal fuse 16 can be prevented. Thus, the disadvantage involved in activation of the thermal fuse is eliminated. The substantial rated value of the thermal fuse is increased, such that the applicable region is extended as compared to the case where a thermal fuse is employed alone. In other words, there is provided a protection apparatus employing an economic thermal fuse, having the area of use of a commercially-available thermal fuse substantially increased. Such an increase of the applicable region is significant in a resistance load for direct current applications, allowing usage exceeding the nominal rated voltage value or rated current value of a thermal fuse.

Current value $I_2$ flowing through the electrosensitive fuse is obtained from equation (1) set forth above, as shown in Tables 2 and 3, based on internal resistance $R_1$ of the thermal fuse, main current I, and internal resistance $R_2$ of the electrosensitive fuse. Table 2 shows main current I and internal resistance $R_2$ of the electrosensitive fuse as parameters when a thermosensitive pellet type thermal fuse with an internal resistance $R_1$ of 1 mΩ is employed. Table 3 shows main current I and internal resistance $R_2$ of the electrosensitive fuse as parameters when a fusible alloy type thermal fuse with an internal resistance $R_1$ of 5 mΩ is employed.

TABLE 2

| | | Main Current I (A) | | | | | | | |
|---|---|---|---|---|---|---|---|---|---|
| | | 1 | 2 | 3 | 4 | 5 | 6 | 7 | 8 |
| Internal Resistance (mΩ) of Electrosensitive Fuse | 10 | 0.0909 | 0.1818 | 0.2727 | 0.3636 | 0.4545 | 0.5455 | 0.6364 | 0.7273 |
| | 20 | 0.0476 | 0.0952 | 0.1429 | 0.1905 | 0.2381 | 0.2857 | 0.3333 | 0.3810 |
| | 30 | 0.0323 | 0.0645 | 0.0968 | 0.1290 | 0.1613 | 0.1935 | 0.2258 | 0.2581 |
| | 50 | 0.0196 | 0.0392 | 0.0588 | 0.0784 | 0.0980 | 0.1176 | 0.1373 | 0.1569 |
| | 100 | 0.0099 | 0.0198 | 0.0297 | 0.0396 | 0.0495 | 0.0594 | 0.0693 | 0.0792 |
| | 500 | 0.0020 | 0.0040 | 0.0060 | 0.0080 | 0.0100 | 0.0120 | 0.0140 | 0.0160 |
| | 1000 | 0.0010 | 0.0020 | 0.0030 | 0.0040 | 0.0050 | 0.0060 | 0.0070 | 0.0080 |

| | | Main Current I (A) | | | | | | |
|---|---|---|---|---|---|---|---|---|
| | | 9 | 10 | 11 | 12 | 13 | 14 | 15 |
| Internal Resistance (mΩ) of Electrosensitive Fuse | 10 | 0.8182 | 0.9091 | 1.0000 | 1.0909 | 1.1818 | 1.2727 | 1.3636 |
| | 20 | 0.4286 | 0.4762 | 0.5238 | 0.5714 | 0.6190 | 0.6667 | 0.7143 |
| | 30 | 0.2903 | 0.3226 | 0.3548 | 0.3871 | 0.4194 | 0.4516 | 0.4839 |
| | 50 | 0.1765 | 0.1961 | 0.2157 | 0.2353 | 0.2549 | 0.2745 | 0.2941 |
| | 100 | 0.0891 | 0.0990 | 0.1089 | 0.1188 | 0.1287 | 0.1386 | 0.1485 |
| | 500 | 0.0180 | 0.0200 | 0.0220 | 0.0240 | 0.0259 | 0.0279 | 0.0299 |
| | 1000 | 0.0090 | 0.0100 | 0.0110 | 0.0120 | 0.0130 | 0.0140 | 0.0150 |

TABLE 3

| | | Main Current I (A) | | | | | | | |
|---|---|---|---|---|---|---|---|---|---|
| | | 1 | 2 | 3 | 4 | 5 | 6 | 7 | 8 |
| Internal Resistance (mΩ) of Electrosensitive Fuse | 10 | 0.3333 | 0.6667 | 1.0000 | 1.3333 | 1.6667 | 2.0000 | 2.3333 | 2.6667 |
| | 20 | 0.2000 | 0.4000 | 0.6000 | 0.8000 | 1.0000 | 1.2000 | 1.4000 | 1.6000 |
| | 30 | 0.1429 | 0.2857 | 0.4286 | 0.5714 | 0.7143 | 0.8571 | 1.0000 | 1.1429 |
| | 50 | 0.0909 | 0.1818 | 0.2727 | 0.3636 | 0.4545 | 0.5455 | 0.6364 | 0.7273 |
| | 100 | 0.0476 | 0.0952 | 0.1429 | 0.1905 | 0.2381 | 0.2857 | 0.3333 | 0.3810 |
| | 500 | 0.0099 | 0.0198 | 0.0297 | 0.0396 | 0.0495 | 0.0594 | 0.0693 | 0.0792 |
| | 1000 | 0.0050 | 0.0100 | 0.0149 | 0.0199 | 0.0249 | 0.0299 | 0.0348 | 0.0398 |

| | | Main Current I (A) | | | | | | |
|---|---|---|---|---|---|---|---|---|
| | | 9 | 10 | 11 | 12 | 13 | 14 | 15 |
| Internal Resistance (mΩ) of Electrosensitive Fuse | 10 | 3.0000 | 3.3333 | 3.6667 | 4.0000 | 4.3333 | 4.6667 | 5.0000 |
| | 20 | 1.8000 | 2.0000 | 2.2000 | 2.4000 | 2.6000 | 2.8000 | 3.0000 |
| | 30 | 1.2857 | 1.4286 | 1.5714 | 1.7143 | 1.8571 | 2.0000 | 2.1429 |
| | 50 | 0.8182 | 0.9091 | 1.0000 | 1.0909 | 1.1818 | 1.2727 | 1.3636 |
| | 100 | 0.4286 | 0.4762 | 0.5238 | 0.5714 | 0.6190 | 0.6667 | 0.7143 |
| | 500 | 0.0891 | 0.0990 | 0.1089 | 0.1188 | 0.1287 | 0.1386 | 0.1485 |
| | 1000 | 0.0448 | 0.0498 | 0.0547 | 0.0597 | 0.0647 | 0.0697 | 0.0746 |

The conditions for selecting an electrosensitive fuse are as set forth above. Specifically, the value of the current flowing through the electrosensitive fuse when the main current flows properly is obtained from equation (1), Table 2, or Table 3, and the rated current is set to at least two times that value. In this case, the internal resistance of the employed thermal fuse, the main current value, and the internal resistance of the electrosensitive fuse per se are required as the factors for determination. FIG. 3A corresponds to a normal state in which disconnection will not occur from the relationship of $I_1 >> I_2$ with the flowing current in protection circuit 20 in a normal usage state. FIG. 3B corresponds to the flowing current state when the thermal fuse of protection circuit 20 is activated at a predetermined operating temperature. When the thermal fuse is activated, the main current I ($=I_2+I_2$) flows to the electrosensitive fuse, up to its cut-off capability, followed by cut-off. Since the electrosensitive fuse is conductive when the thermal fuse is activated, the disadvantage involved in sparks and welding between the electrodes of the thermal fuse will not occur.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A protection apparatus comprising a protection circuit connected in series between a power supply and a load, wherein said protection circuit comprises a thermal fuse with a predetermined operating temperature, adapted to be activated in response to sensing overheating of the power supply and/or the load, and an electrosensitive fuse connected in parallel with said thermal fuse, and adapted to be activated at a predetermined operating current, wherein said electrosensitive fuse is adapted to be activated only after said thermal fuse is activated at the predetermined operating temperature, and wherein said thermal fuse and said electrosensitive fuse are general-purpose type fuses, and said thermal fuse is used in a range exceeding a nominal rated voltage value or a nominal rated current value of said thermal fuse.

2. The protection apparatus according to claim 1, wherein said protection circuit is embodied so that a flowing current of said electrosensitive fuse is at most 50% with respect to a main current of said load, said predetermined operating current at which said electrosensitive fuse is activated is set to at least two times the flowing current of said electrosensitive fuse and lower than 100% of the main current, and said electrosensitive fuse is cut off after activation of said thermal fuse to prevent generation of discharge across electrodes of said thermal fuse.

3. The protection apparatus according to claim 1, wherein said thermal fuse includes a thermosensitive pellet type thermal fuse having an internal resistance of at most 1.5 mΩ/25 mm, or a fusible alloy type thermal fuse having an internal resistance of at most 15 mΩ/25 mm.

4. The protection apparatus according to claim 1, wherein said protection circuit is adapted to have a time lag between activation of said thermal fuse at said predetermined operating temperature and activation of said electrosensitive fuse.

5. The protection apparatus according to claim 1, wherein said electrosensitive fuse includes a current fuse or a resistance fuse of a time lag type, and an internal resistance of said electrosensitive fuse is larger than an internal resistance of said thermal fuse.

6. The protection apparatus according to claim 1, wherein said protection apparatus does not include an additional electrosensitive fuse connected in series with said thermal fuse.

7. A protection apparatus comprising a protection circuit connected in series between a power supply and a load, wherein said protection circuit is formed of a parallel circuit including a thermal fuse with a predetermined operating temperature, adapted to be activated in response to sensing overheating, and an electrosensitive fuse adapted to be activated at a predetermined operating current, wherein said protection circuit is adapted to have a time lag between activation of said thermal fuse at said predetermined operating temperature and activation of said electrosensitive fuse, and wherein said thermal fuse and said electrosensitive fuse are general-purpose type fuses, and said thermal fuse is used in a range exceeding a nominal rated voltage value or a nominal rated current value of said thermal fuse.

8. The protection apparatus according to claim 7, wherein said electrosensitive fuse includes a current fuse or a resistance fuse of a time lag type, and an internal resistance of said electrosensitive fuse is larger than an internal resistance of said thermal fuse.

9. The protection apparatus according to claim 7, wherein said thermal fuse is adapted to be activated in response to sensing overheating of the power supply and/or the load, and said electrosensitive fuse is connected electrically in parallel with said thermal fuse.

10. The protection apparatus according to claim 7, wherein said protection circuit is embodied so that a flowing current of said electrosensitive fuse is at most 50% with respect to a main current of said load, said predetermined operating current at which said electrosensitive fuse is activated is set to at least two times the flowing current of said electrosensitive fuse and lower than 100% of the main current, and said electrosensitive fuse is cut off after activation of said thermal fuse to prevent generation of discharge across electrodes of said thermal fuse.

11. The protection apparatus according to claim 7, wherein said thermal fuse includes a thermosensitive pellet type thermal fuse having an internal resistance of at most 1.5 mΩ/25 mm, or a fusible alloy type thermal fuse having an internal resistance of at most 15 mΩ/25 mm.

12. The protection apparatus according to claim 7, wherein said protection apparatus does not include an additional electrosensitive fuse connected in series with said thermal fuse.

13. An electrical apparatus comprising:

a power supply;

a load; and a protection circuit connected in series in a current flow path between said power supply and said load;

wherein:

said protection circuit comprises a first protection circuit path and a second protection circuit path connected parallel to one another between first and second nodes in said current flow path between said power supply and said load, said first protection circuit path includes at least one thermal fuse and no electrosensitive fuse;

said second protection circuit path includes at least one electrosensitive fuse;

said at least one thermal fuse is adapted to switch from a closed circuit condition to an open circuit condition at a predetermined activation temperature, and is arranged in thermal communication with at least one of said power supply or said load so that an overheating temperature of said at least one of said power supply or said load will cause said at least one thermal fuse to reach or exceed said predetermined activation temperature;

said at least one electrosensitive fuse is adapted to switch from a closed circuit condition to an open circuit condition at a predetermined tripping current flowing through said at least one electrosensitive fuse; and said protection circuit is adapted and embodied to carry a total operating current at a total operating voltage in said current flow path between said power supply and said load, said at least one thermal fuse is adapted and embodied to carry a first current portion of said total operating current, and said at least one electrosensitive fuse is adapted and embodied to carry a second current portion of said total operating current wherein said predetermined tripping current is greater than said second current portion and less than said total operating current.

14. The electrical apparatus according to claim 13, wherein said current flow path between said power supply and said load essentially consists of said at least one thermal fuse, said at least one electrosensitive fuse, and conductors.

15. The electrical apparatus according to claim 13, wherein said apparatus includes no switch interposed in said current flow path between said power supply and said load.

16. The electrical apparatus according to claim 13, wherein said apparatus includes no additional electrosensitive fuse arranged in series with said at least one thermal fuse or in series with said at least one electrosensitive fuse between said power supply and said load.

17. The electrical apparatus according to claim 13, wherein one conduction path between said power supply and said load passes only through one or more conductors and said at least one thermal fuse without any additional circuit-interrupting element interposed in said conduction path.

18. The electrical apparatus according to claim 13, wherein said at least one thermal fuse has at least one of a nominal rated maximum voltage value or a nominal rated maximum current value at which said at least one thermal fuse is rated to operate, and wherein said apparatus is embodied so that said first current portion of said total operating current is greater than said nominal rated maximum current value or so that said total operating voltage is greater than said nominal rated maximum voltage value.

19. The electrical apparatus according to claim 18, wherein said first current portion of said total operating current is greater than said nominal rated maximum current value.

20. The electrical apparatus according to claim 18, wherein said total operating voltage is greater than said nominal rated maximum voltage value.

21. The electrical apparatus according to claim 18, wherein said total operating voltage is greater than said nominal rated maximum voltage value, and wherein said first current portion of said total operating current is greater than said nominal rated maximum current value.

22. The electrical apparatus according to claim 13, wherein a resistance of said at least one electrosensitive fuse is in a range from 2 to 30 times a resistance of said at least one thermal fuse.

* * * * *